US 6,527,318 B2

(12) United States Patent
Kolper

(10) Patent No.: US 6,527,318 B2
(45) Date of Patent: Mar. 4, 2003

(54) HAILO-COVER

(76) Inventor: Michael B. Kolper, 8530 Dogwood Rd., Baltimore, MD (US) 21244

( * ) Notice: Subject to any disclaimer, the term of this patent is extended or adjusted under 35 U.S.C. 154(b) by 0 days.

(21) Appl. No.: 09/906,164

(22) Filed: Jul. 16, 2001

(65) Prior Publication Data
US 2002/0005654 A1 Jan. 17, 2002

Related U.S. Application Data
(60) Provisional application No. 60/218,219, filed on Jul. 14, 2000.

(51) Int. Cl.[7] .................................................. B60R 19/42
(52) U.S. Cl. .................. 293/126; 296/100.15; 293/116; 410/100
(58) Field of Search .............................. 296/98, 100.01, 296/100.15, 100.16, 136; 293/116, 126, 127, 128; 160/128, 330; 150/166; 410/97, 100, 118

(56) References Cited
U.S. PATENT DOCUMENTS 4,036,521 A * 7/1977 Clenet .................... 296/100.15
4,848,828 A * 7/1989 Hunt .................. 296/100.15 X
4,968,085 A * 11/1990 Stann .................... 296/100.16
5,605,369 A * 2/1997 Ruiz ........................... 296/136
5,641,179 A * 6/1997 Imlach .................... 293/128 X
5,788,307 A * 8/1998 Gilbert .................... 293/126 X
5,944,372 A * 8/1999 Gilbert .................... 293/126 X

* cited by examiner

Primary Examiner—Joseph D. Pape
Assistant Examiner—Jason Morrow
(74) Attorney, Agent, or Firm—Law Offices of Royal W. Craig

(57) ABSTRACT

The Hailo-cover is a truck bed cover system including a pair of side panels and an end panel all having a fastening strip spanning the upper width for removable attachment to the inner rim of a truck flatbed. In addition, the side panels and end panel all have a plurality of fastening straps extending downwardly and with distal fastening means thereon for overlapping attachment to the opposing fastening strap of the other panels. This configuration allows the opposing side panels and tailgate panel to be opened and hung exteriorly of the truck bed to protect the exterior surfaces and prevent scratches, dents and dings. Alternatively, the panels can be draped over a payload and joined via the fastening straps to cover and protect the payload in the truck bed, or they can be secured in a rolled configuration and stowed.

13 Claims, 4 Drawing Sheets

HAILO-COVER

CROSS-REFERENCE TO RELATED APPLICATIONS

The present application derives priority from U.S. Provisional Patent Application No. 60/218,219 for "HAILO-COVER", filed Jul. 14, 2000.

BACKGROUND OF THE INVENTION

1. Field of the invention

The present invention relates to truck bed covers and, more particularly, to a convertible to cover that additionally protects the side body panels of a work truck.

2. Description of the Background

Conventional pickup truck flat bed covers include both hard shell and soft varieties, and the latter are generally a leather or vinyl fabric panel that is stretched across the bed of the truck and attached to the side walls of the bed by snap fasteners. For example, U.S. Pat. No. 5,165,750 to Pirhonen shows a cover for a truck bed which includes a framework of bars connected around a truck bed, and a flexible sheet of cover material detachably connected to the bars by fasteners cooperatively aligned and placed about the peripheral edge marginal region of the cover and the respective bars. Such covers have long been known and used for covering and protecting payloads, and as much for aesthetic value as they substantially improve the appearance of the truck. However, the protection afforded extends only insofar as the truck bed and not to the exterior of the truck.

There is an equal need to protect the exterior sides and tailgate of the truck bed, especially for workmen's trucks where tools and equipment are retrieved from the truck bed quite frequently throughout the course of an average work day. Otherwise, it soon becomes very expensive to repair all the scratches, dents and dings that result from dropped tools and loading/unloading of heavy equipment.

The problem is reflected in U.S. Pat. No. 5,209,545 to Slaugh, which suggests a solution in the form of a protective off-highway covering for all exterior sidewalls of the truck. The covering is made in separate cover sets of tough and strong flexible material, each set being made up of separate pieces for attachment to a longitudinal side of a pick-up truck. The pieces are to attached by fasteners including marginal pockets in the sheet material for engaging parts of the vehicle, sets of snap fasteners, and strip fasteners.

Unfortunately, the Slaugh '545 patent is not an economical solution inasmuch as it attempts to cover all exterior paint, whereas only the immediate work areas (truck bed sidewalls and tailgate) need protection. It would be greatly advantageous to provide mats (or panels) for protecting the truck bed sidewalls and tailgate and, in addition, panels that easily convert into a cover for the contents of the truck bed.

SUMMARY OF THE INVENTION

It is, therefore, an object of the present invention to provide a set of fitted convertible panels that can be particularly configured either to safely protect the external work areas of a truck bed (sidewalls and tailgate), or to serve as a payload cover.

It is another object to provide convertible protective panels as described above that provide for quick and easy insertion and removal for storage.

It is another object to provide a pattern for convertible protective panels that results in a high degree of stability and durability.

It is a further object to provide a set of convertible protective panels as described above that can be manufactured easily and economically.

It is still another object to provide a set of convertible protective panels as described above that can be embellished with sports logos or the like to serve an ornamental display purpose as well as a protective purpose when used at tailgates, etc.

In accordance with the above-described object, the present invention provides a pair of side panels and an end panel all having a fastening strip spanning the upper width for removable attachment to the inner rim of a truck flatbed. In addition, the side panels and end panel all have a plurality of fastening straps extending downwardly and with distal fastening means thereon for overlapping attachment to the opposing fastening strap of the other panels. This configuration allows the opposing side panels and tailgate panel to be opened and hung exteriorly of the truck bed to protect the exterior surfaces and prevent scratches, dents and dings, or alternatively draped over a payload and joined via the fastening straps to cover and protect the payload in the truck bed. All of the side panels and end panel are preferably comprised of double-layer sections of reinforced fabric sewn together at the margins and centrally reinforced by a cross-stitch pattern at the mid-section. The fastening straps are likewise double-layer sections of reinforced fabric sewn together at the margins and centrally reinforced, and having opposing hook and loop sections of fabric sewn along both sides of the distal extent.

The inner surfaces of the convertible panels can easily be embellished with sports logos or the like by screen printing or embroidering to serve an ornamental display purpose. This way, when the convertible panels are unfurled for protection at tailgates or the like, they serve an additional protective purpose.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENT

Figure 1:
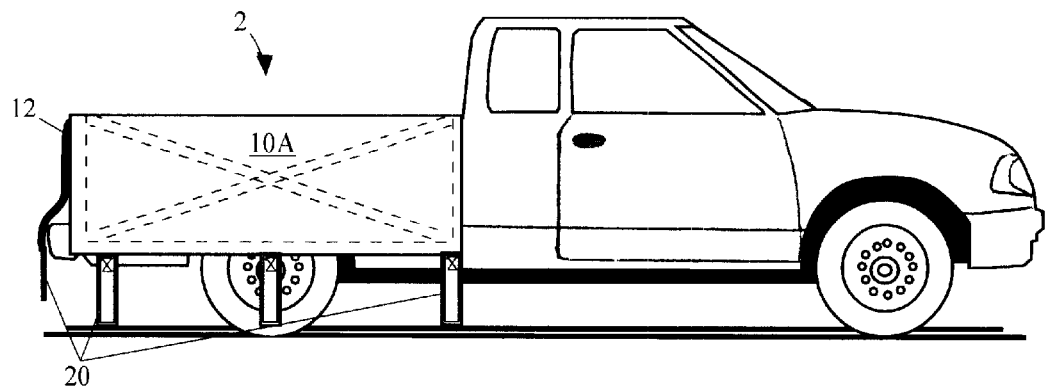
FIG. 1 is a perspective side view of a typical pickup truck shown with the Hailo-Cover according to the present invention draped over one wall of the truck bed for protection of the exterior work area.

FIG. 1 is a perspective side view of a typical pickup truck shown with one side panel 10A of the Hailo-Cover 2 according to the present invention draped over one wall of the truck bed for protection of the exterior work area. Side panel 10A is a generally rectangular fabric panel attachable along one side to the inner wall of the truck bed to thereby extend the entire length of the truck bed. An opposing side panel 10B (not shown in FIG. 1) extends the entire length of the truck bed on the other side. A tailgate panel 12 of Hailo-Cover 2 is seen draped over the tailgate of the truck. Tailgate panel 12 is likewise a generally rectangular fabric panel attachable along the inner wall of the truck tailgate to extend the width of the tailgate.

In the preferred embodiment, a plurality (preferably three) fastening straps 20 are evenly spaced and attached along the margins of the side panel 10A for joinder with like fastening straps 20 on the opposing side panel 10B (not seen). The tailgate panel 12 likewise has a plurality (preferably two) fastening straps 20 evenly spaced and attached along the margins of the tailgate panel 12 for joinder with the fastening straps 20 on the side panels 10A and 10B. In general operation, the opposing side panels 10A and 10B may be opened and hung as shown to protect the exterior of the truck around the work area. The tailgate panel 12 may be opened and hung as shown over the rear surface of the tailgate to protect the exterior of the tailgate. The collective protection afforded by the side panels 10A and 10B and tailgate panel 12 effectively prevents any scratches, dents and dings that result from dropped tools and loading/unloading of heavy equipment.

When the user's day is finished, the user simply loads his tools and equipment back into the truck bed, folds the opposing side panels 10A and 10B inward across the open truck bed, and attaches side panels 10A and 10B to each other via fastening straps 20. Similarly, the tailgate panel 12 is folded inward over the rear of the truck bed and is attached by its fastening straps 20 to those of the side panels 10A and 10B. In this configuration the side panels 10A and 10B and tailgate panel 12 effectively protect and secure the cargo.

In addition to the fastening straps 20, the same number of roll strips 23 (see FIG. 3) are attached to the side panels 10A and 10B and tailgate panel 12. Each roll strip 23 is secured at one end proximate the base of a corresponding fastening strap 20. The roll strips 23 are adapted to be secured by their free ends to a mating fastener 33 located across the side panels 10A & B and the tailgate panel 12. This allows the side panels 10A & B and the tailgate panel 12 to be rolled up, secured (by attaching the roll strips 23 around the rolled-up side panels 10A & B and the tailgate panel 12 to the respective fasteners 33), and stowed when not in use.

Figure 2:
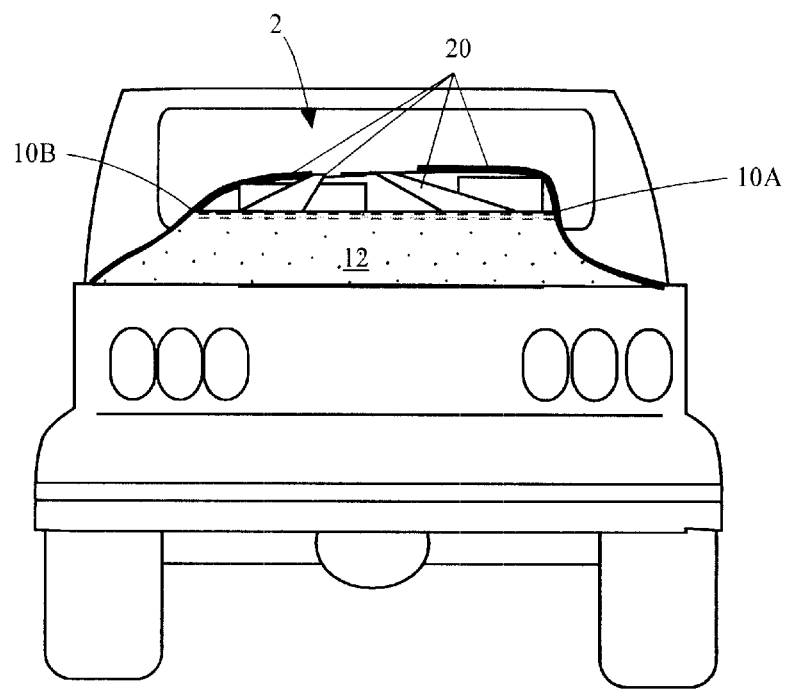
FIG. 2 is a perspective back view of the pickup truck and Hailo-Cover 2 of FIG. 1.

Each of the fastening straps 20 of side panels 10A and 10B are equipped with mating fasteners, and these are joined together as shown in FIG. 2. The fastening straps 20 of tailgate panel 12 are likewise equipped with mating fasteners and these are laid over and fastened onto the fastening straps 20 of side panels 10A and 10B. This results in a secure total cover for virtually any payload. One of the primary advantages of this configuration is the adjustability to adapt to any size payload. All of the fastening straps 20 extend from their respective panels by a fair measure, and yet it only takes approximately 1–2" of overlap to ensure a secure bond between two overlapping fastening straps 20. Consequently, the side panels 10A and 10B and tailgate panel 12 and respective fastening straps 20 can be adjusted to cover a larger payload as much as possible, or to fully cover a smaller payload.

Figure 3:
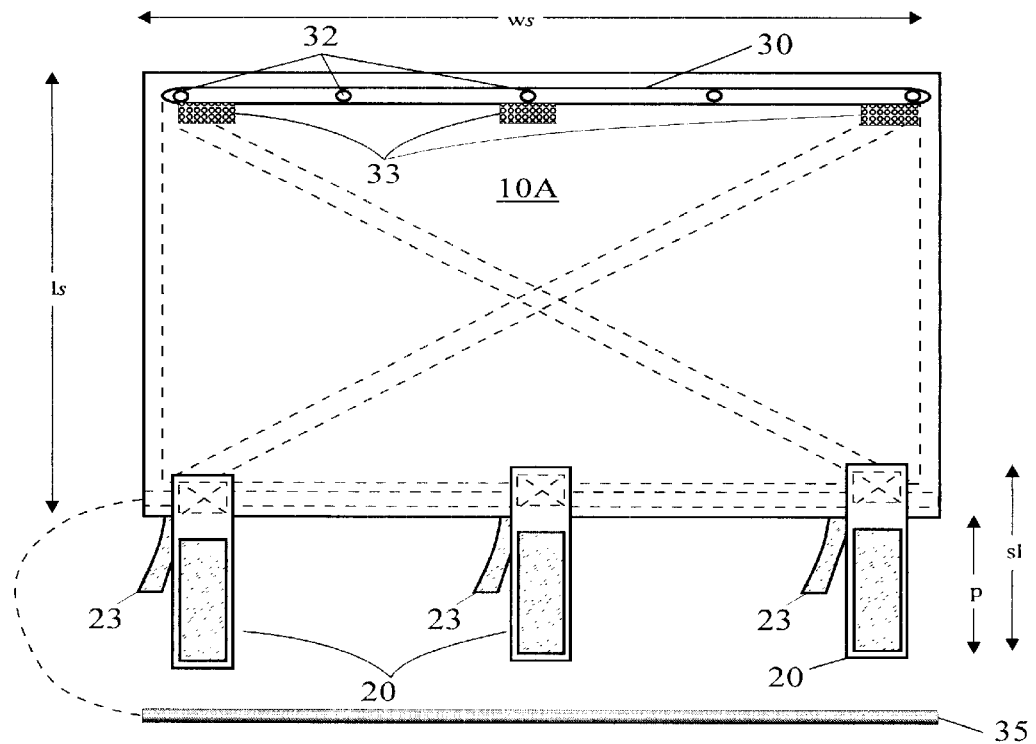
FIG. 3 is front view of one of the side panels 10 of Hailo-Cover 2 showing the pattern of components for production.

FIG. 3 is front view of one of the side panels 10 of Hailo-Cover 2 showing the pattern of components for production. The opposing side panels 10A & 10B can and should be identical for economy of manufacture. Each side panel is preferably comprised of two dimensionally similar rectangular sections of fabric sewn together, although a single-ply heavier denier may be used. A suitable single-ply fabric is pack cloth because it combines a tough tear-resistant outer side with a soft inner side that tends to polish the truck. However, two-ply combinations of duck cloth, Sunbrella™, Vinyl, or reinforced ("rip-stop") Nylon fabric with a fleece layer will also suffice. In the latter case, the two sections of fabric are sewn together around their periphery to yield a thick padded protective layer.

As seen in FIG. 3, a single-ply fabric is doubled over along the lower margin and is sewn onto itself to leave an open margin along the bottom for receiving reinforcing dowels 35. This is accomplished with a two-ply combination simply by a double seam as shown. In either case, the reinforcing dowels 35 are then inserted into the open margin to provide horizontal reinforcement along the bottom of both the opposing side panels 10A & 10B. The dowels 35 may be PVC plastic or wood.

Each of the opposing side panels 10A & 10B are centrally reinforced by sewing a double-X pattern as shown across the mid-section. The width ws of the completed side panels 10A & 10B is on the order of approximately 72", although this dimension can be varied in accordance with the length of the truck bed at hand. It is contemplate that various standard-size sets of fitted convertible panels will be produced for various standard truck sizes. For the illustrated embodiment, the length ls of each side panel 10A & 10B is a more fixed dimension and should be approximately 36". A reinforced fastening strip 30 spans the upper width of each side panel 10A & 10B for removable attachment to the inner rim of the truck's flatbed. Fastening strip 30 generally comprises an elongate strip of heavy duty material such as canvas with evenly-spaced fasteners attached there along. In the illustrated embodiment, the fasteners are snap fasteners 32 adapted to mate with accessory snaps that are provided along the inner rim of the truck bed on many conventional trucks. Approximately five to six snap fasteners 32 are required to be evenly spaced across the strip, and five at 11 ¾" intervals will fit many trucks. It should be understood, however, that any other type of fastener may be used instead for this purpose including hook and loop fastening pads.

The fastening straps 20 extending from each side panel are likewise each preferably comprised of two identical smaller rectangular sections of pack cloth, reinforced ("rip-stop") Nylon, canvas fabric, etc. The two sections of fabric are sewn together around their periphery to yield a durable tear-resistant strap. The two sections of fabric are centrally reinforced by sewing a single-X pattern as shown across the mid-section. The length sl of each fastening strap 20 should be approximately 24", and a portion of the length is permanently attached to the respective side panel 10A & 10B. The protruding portion of the length p protrudes orthogonally from the margins of the side panels 10A & 10B by approximately 18", and this entire extent is equipped with a section of hook fastener material on one side, and a section of loop fastener material on the other side. It is essential that the hook section of one fastening strap 20 on one side panel 10A correspond to a loop section of the mating fastening strap 20 on the opposing side panel 10B, although this can be accomplished in a number of combinations.

Figure 4:
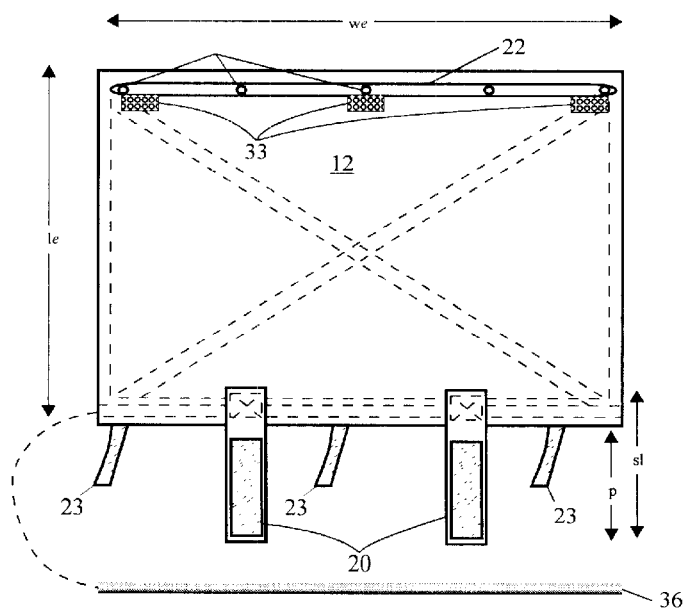
FIG. 4 is front view of one of the tailgate panel 12 of Hailo-Cover 2 showing the pattern of components for production.

FIG. 4 is front view of the tailgate panel 12 of Hailo-Cover 2 showing the pattern of components for production. The tailgate panel 12 is likewise preferably comprised of a single-ply or double ply sections of pack cloth, fleece, reinforced ("rip-stop") Nylon fabric, or a combination of both as with side panels 10A & 10B. Two-ply sections of fabric should be sewn together around their periphery to yield a thick padded protective layer. The two sections of Fabric are centrally reinforced by sewing a double-X pattern as shown across the mid-section. The width we of each Fabric panel of the completed tailgate panel 12 is on the order of approximately 32", although this dimension can be varied in accordance with the breadth of the truck bed at hand. The length le of the tailgate panel 12 is a more fixed dimension and should be approximately 36". A reinforced fastening strip 22 spans the upper width of the tailgate panel 12 for removable attachment to the inner rim of the truck's tailgate. Fastening strip 22 generally comprises an elongate strip of heavy duty material such as canvas with evenly-spaced fasteners attached there along. In the illustrated embodiment, the fasteners are snap fasteners 32 adapted to mate with accessory snaps that are provided along the inner rim of the truck tailgate on many conventional trucks. For this purpose, snap fasteners 32 should be evenly spaced at 11 ¾" intervals across the strip 22. It should be understood, however, that any other type of fastener may be used instead for this purpose including hook and loop fastening strips.

The two fastening straps 20 extending downwardly from the tailgate panel 12 are constructed exactly as those attached to the side panels 10A and 10B. It is required that the hook/loop section of the fastening straps 20 on the tailgate panel 12 correspond to an opposite section of the mating fastening straps 20 on the opposing side panels 10A and 10B, although this again can be accomplished in a number of combinations.

As in FIG. 3, the two layers of fabric in FIG. 4 may be sewn together to leave an open margin along the bottom for receiving a reinforcing dowel 36 (or the margins doubled over for single-ply fabric). The reinforcing dowel 36 is inserted into the margin to provide horizontal reinforcement along the bottom of tailgate panel 12. The dowel 36 may be PVC plastic or wood.

Given the configuration described with respect to FIGS. 1–4, the opposing side panels 10A and 10B and tailgate panel 12 may be opened and hung as shown in FIG. 1 to protect the exterior of the truck around the work area to effectively prevent scratches, dents and dings that result from dropped tools and loading/unloading of heavy equipment. Alternatively, the opposing side panels 10A and 10B and tailgate panel 12 may be draped over a payload and joined via fastening straps 20 to cover the payload.

Figure 5:
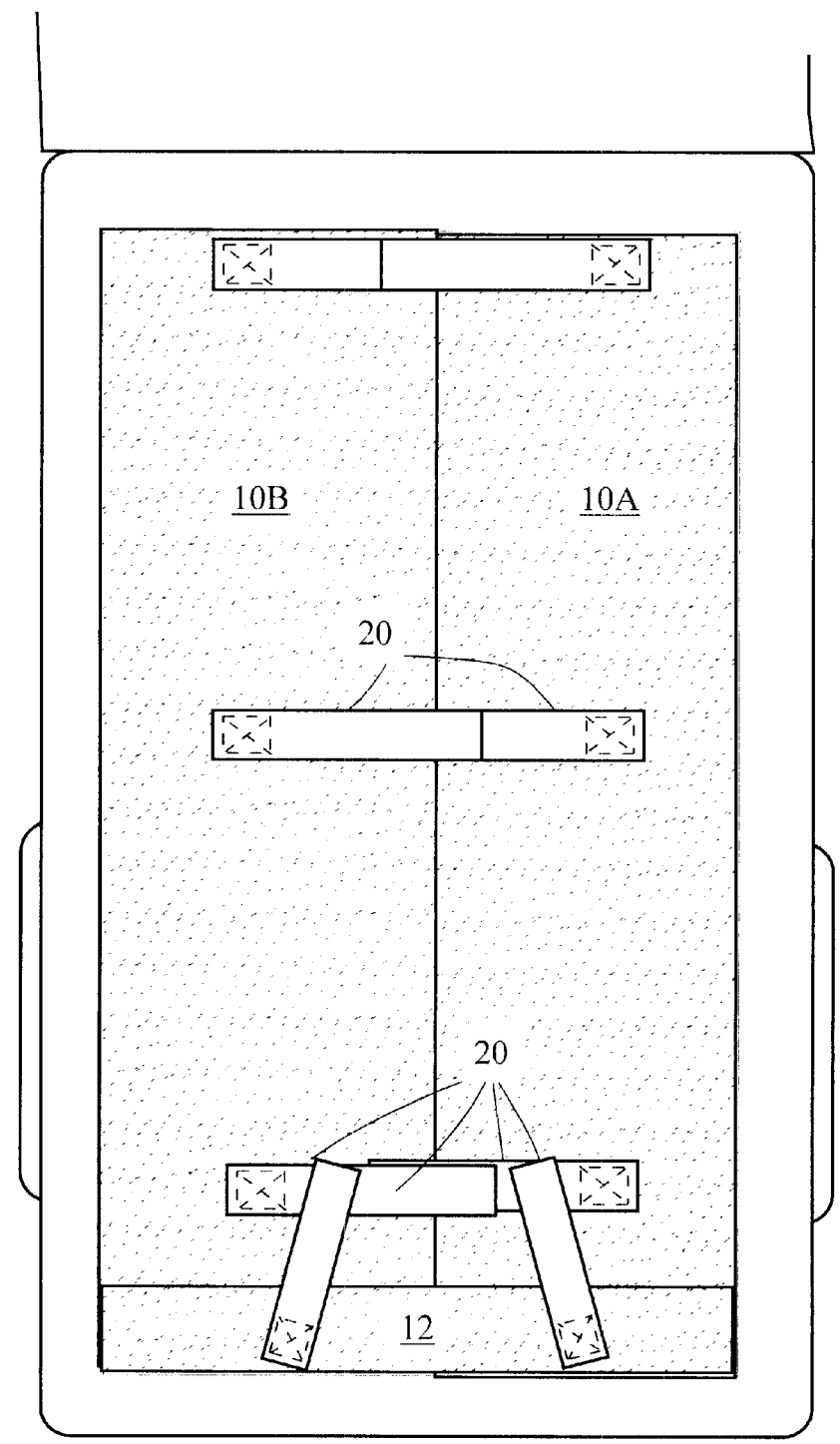
FIG. 5 is a top perspective view of the pickup flatbed and Hailo-Cover 2 of FIGS. 1–4 as used in covering a payload.

FIG. 5 is a top perspective view of the pickup flatbed and Hailo-Cover 2 of FIGS. 1–4 as used in covering a payload.

Still further, all of the opposing side panels 10A and 10B and tailgate panel 12 may be conveniently removed, rolled and stored in a conventional truck box or otherwise. The foregoing convertible protective panels are patterned according to a design that results in a high degree of stability and durability, and years of use are expected. On the other hand, the panels are comprised of uniform components and fabric panels and can be manufactured easily and economically.

To increase the promotional and/or aesthetic value of the Hailo-cover 2, design logos may be embroidered or silk-screened onto the exterior of the side panels 10A & 10B and tailgate panel 12. Specifically, sports logos add an additional dimension to the Hailo-cover and make it more appealing for use at tailgates or the like.

Figure 6:
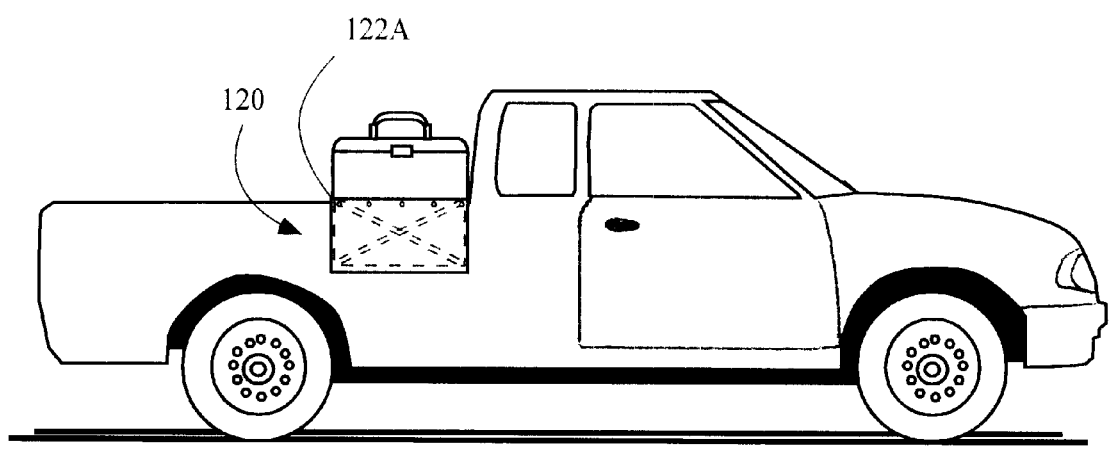
FIG. 6 is a perspective side view of an optional protective accessory 120 for use with tool boxes.

FIG. 6 is a perspective side view of an optional protective accessory 120 for use with cross-bed tool boxes or "lock-boxes". Protective accessory 120 is constructed similarly as the side panels 10A & 10B and is intended to be attached to a conventional cross-bed tool box. This way, when the tool box is installed in the bed of the truck in a typical manner, protective accessory 120 may be draped over the side of the truck bed for protection of the exterior work area directly in front of the tool box. Protective accessory 120 is likewise a generally rectangular fabric panel attachable along the lower periphery of the tool box and extending the width thereof. Snap fasteners 122A may be used for attachment, although other attachment means such as Velcro pads serve equally well.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, further conceptually identical panels may be constructed to cover, for example, the storage box resident behind the cab, etc. It is to be understood, therefore, that the invention may be practiced otherwise than as specifically set forth in the appended claims.

I claim:

1. A convertible cover that selectively unfurls to protect the side body panels of a truck bed, or that closes to cover the cargo area the truck bed, comprising:

a first side panel removably attached along one side interiorly of a truck bed wall and having another side bearing a plurality of fastening straps;

a second side panel removably attached along one side interiorly of an opposing truck bed wall and having another side bearing a corresponding plurality of fastening straps adapted to attach to the fastening straps of the first side panel;

a tailgate panel removably attached along one side interiorly of a tailgate of said truck and having a pair of fastening straps adapted to attach to the overlying fastening straps of the first and second side panels;

whereby the opposing first and second side panels and tailgate panel may be opened and draped over the respective truck bed walls and tailgate to protect the exterior of the truck, or may be draped over a payload in the truck bed and joined via said fastening straps to cover said payload.

2. The convertible cover according to claim 1, wherein said first side panel, second side panel and tailgate panel are formed of single-ply pack cloth to provide a tear resistant exterior when unfurled and soft interior against the truck.

3. The convertible cover according to claim 1, wherein said first side panel, second side panel and tailgate panel are formed of two-ply fabric sections sewn together to provide a tear resistant exterior when unfurled and soft interior against the truck.

4. The convertible cover according to claim 1, wherein said first side panel, second side panel and tailgate panel are formed with open margins along one side thereof, and said first side panel, second side panel and tailgate panel each include a dowel inserted through the open margins to provide horizontal reinforcement.

5. The convertible cover according to claim 4, wherein said first side panel, second side panel and tailgate panel each include a plurality of roll straps spaced lengthwise and attached along said open margins for securing each of said first side panel, second side panel and tailgate panel in a rolled position.

6. The convertible cover according to claim 1, wherein said first side panel, second side panel and tailgate panel are adorned with a design logo for aesthetic value.

7. The convertible cover according to claim 1, further comprising a protective tool box panel adapted for attachment to a tool box when perched on a truck bed wall and adapted to be draped over the truck bed wall to protect the exterior of the truck.

8. A set of protective covers for a pickup truck, comprising:

a pair of side panels and an end panel all further comprised of sections of fabric centrally reinforced by a cross-stitch pattern at the mid-section, a fastening strip spanning the upper width of the side panels and end panel for removable attachment to the inner rim of a truck flatbed, and a plurality of fastening straps extending downwardly from each of the side panels and end panel and having distal fastening means thereon for overlapping attachment to another opposing fastening strap. wherein the opposing side panels and tailgate panel may be opened and hung exteriorly of the truck bed to protect the exterior surfaces and prevent scratches and dents, or may be draped over a payload and joined via said fastening straps to cover and protect the payload.

9. A set of protective covers for a pickup truck according to claim 8, wherein said side panels and tailgate panel are formed of two-ply fabric sections sewn together to provide a tear resistant exterior when unfurled and soft interior against the truck.

10. A set of protective covers for a pickup truck according to claim 8, wherein said side panels and tailgate panel are formed with open margins along one side thereof, and each include a dowel inserted through the open margins to provide horizontal reinforcement.

11. A set of protective covers for a pickup truck according to claim 10, wherein said side panels and tailgate panel each include a plurality of roll straps spaced lengthwise and attached along said open margins for securing each of said side panels and tailgate panel in a rolled position.

12. A set of protective covers for a pickup truck according to claim 8, wherein each of said side panels and tailgate panel are adorned with a design logo for aesthetic value.

13. A set of protective covers for a pickup truck according to claim 8, further comprising a protective tool box panel adapted for attachment to a tool box when perched on a truck bed wall and adapted to be draped over the truck bed wall to protect the exterior of the truck.

* * * * *